Nov. 21, 1944.    A. C. DE NAPOLI, JR    2,363,403
CONTINUOUS FILM MAGAZINE
Filed Feb. 16, 1942    3 Sheets-Sheet 1

INVENTOR
Anthony C. De Napoli, Jr.
BY
ATTORNEY

Nov. 21, 1944.    A. C. DE NAPOLI, JR    2,363,403
CONTINUOUS FILM MAGAZINE
Filed Feb. 16, 1942    3 Sheets-Sheet 2
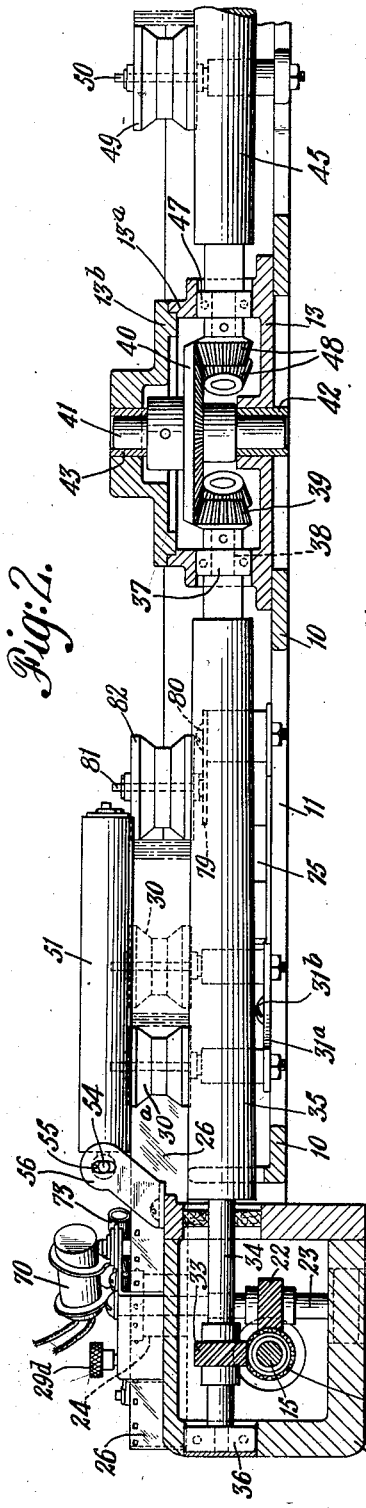
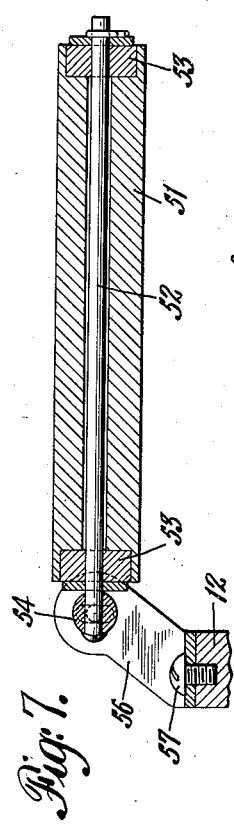
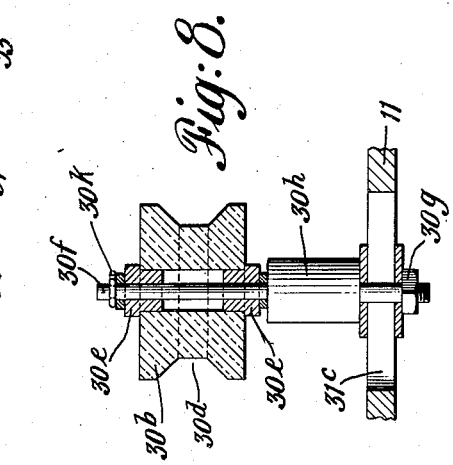
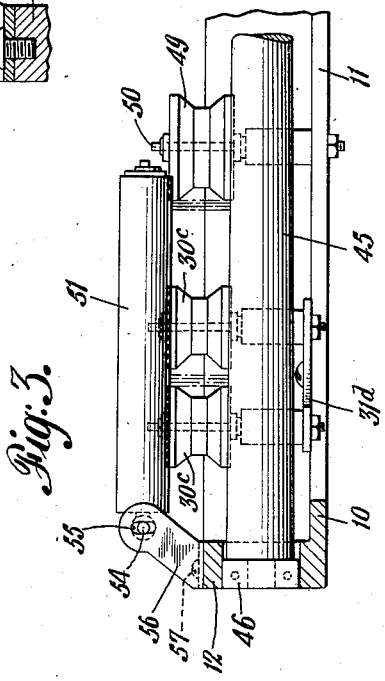
INVENTOR
Anthony C. De Napoli, Jr.
BY
ATTORNEY

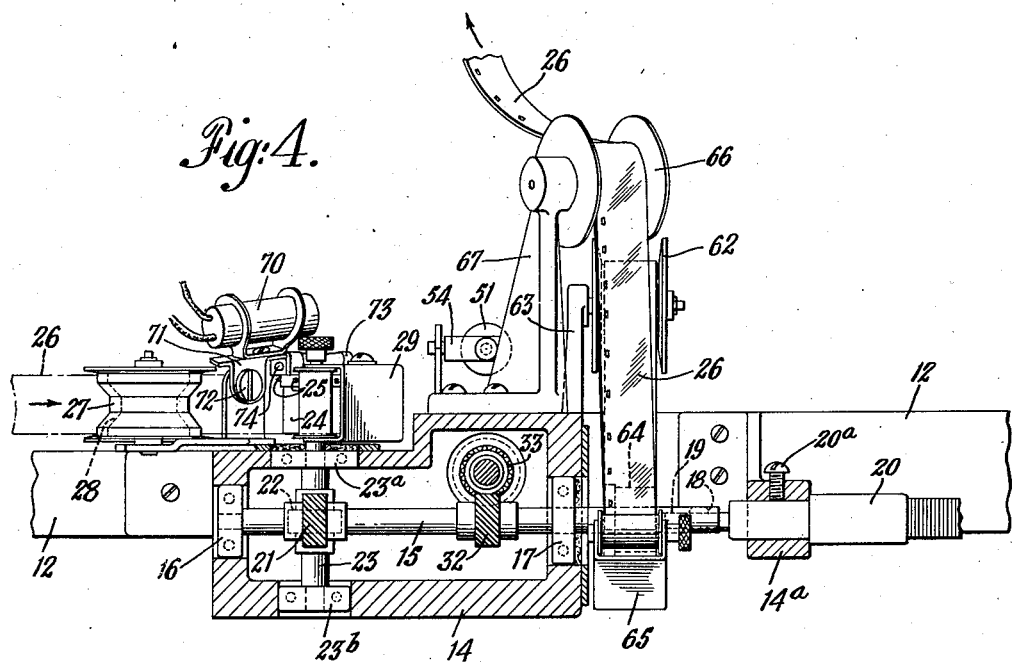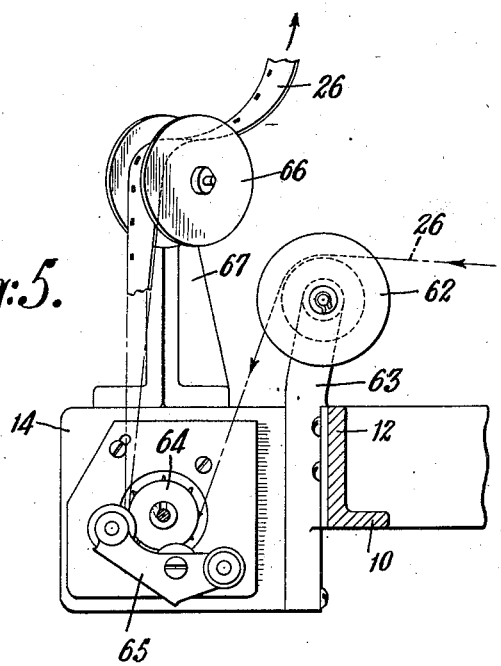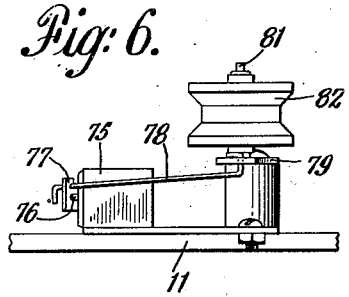

Patented Nov. 21, 1944

2,363,403

UNITED STATES PATENT OFFICE 2,363,403

CONTINUOUS FILM MAGAZINE

Anthony C. De Napoli, Jr., Mount Vernon, N. Y., assignor, by mesne assignments, to Films, Incorporated, New York, N. Y., a corporation of New York Application February 16, 1942, Serial No. 431,046

14 Claims. (Cl. 88—18.7)

This invention relates to magazines for the storage of endless or continuous moving picture films of either the sound or silent type. It may be used for other similar purposes also, wherever it is desired to store a film or band or tape of flexible material which is to be continuously or intermittently fed from the storage means and returned to the latter.

An object of the present invention has been to provide a simple but effective storage device or magazine for films and the like, of the character specified, in which a relatively long film may be retained and to and from which the film may be fed with a minimum of wear and strain upon the same and with a minimum of damage to its surface.

Such a magazine may be employed, for example, in a coin-operated machine arranged to display a section of film with accompanying music upon each insertion of a coin. The improved construction is adapted to provide a relatively large number of the individual film sections and the arrangement is such that the magazine may be readily inserted and removed so that one series of films may be quickly substituted for another. The magazine may also be used, if desired, to retain a film for a complete program in a regular moving picture theater, thus enabling the same program to be repeated a number of times without rewinding the film.

In the use of the improved magazine in a coin-controlled moving picture unit, an endless film of, say, 1600 feet may be stored, a loop of some 30 inches extending from the magazine and passing to and from suitable picture projecting and sound reproducing means. The portion of the loop passing through the projector is fed intermittently at an appropriate speed in the conventional manner, while the portion passing through the sound reproducing unit is fed continuously at the same average speed. In the magazine the film is preferably advanced continuously at this average speed in a plurality of concentric coils, the film being withdrawn from the inner coil, to form the loop, and returned to the outer coil. A certain relative rotation necessarily occurs between the various coils since the linear velocity must be the same at all points while the radii of the successive coils vary. It is important, therefore, to so maintain the film in the magazine that the coils are relatively free and the rubbing of the surfaces of the adjacent coils in their relative rotation is reduced to a minimum. This is achieved effectively in accordance with the present invention.

The desired end is accomplished through a combination of features. These include the withdrawal of the film from the inner coil and its return to the outer, the employment of driven supporting rollers at appropriate intervals beneath the coils of the film, these rollers being tapered, but only slightly, with their larger diameters outermost, the provision of freely rotatable gravity rollers above the coils in vertical alinement with certain, but not all, of the driven rollers below, and the slight tilting of the entire magazine.

Special features of the invention are the provision of means for arresting the operation of the feed mechanism of the magazine, and preferably also stopping the machine as a whole, whenever a break occurs in the film at its point of introduction into the magazine and if the film should become too taut or wound too tightly in the magazine.

Other objects, features and advantages of the invention will appear from a detailed description of an illustrative embodiment of the same which will now be given in conjunction with the accompanying drawings, in which:

Fig. 2 is a vertical section on an enlarged scale through a portion of the magazine, taken along the line 2—2 of Fig. 1.

Fig. 3 is a vertical section on a similarly enlarged scale showing a detail of the construction along the line 3—3 of Fig. 1.

Fig. 4 is a side elevation of a portion of the structure, as viewed from the left in Fig. 1, parts of the frame being shown in section.

Fig. 5 is an enlarged vertical section, along the line 5—5 of Figure 1, showing a portion of the film feeding and guiding devices.

Fig. 6 is a side elevation of one of the control switches and operating means therefor embodied in the magazine.

Fig. 7 is a vertical, axial section through one of the top gravity rollers, and, Fig. 8 is a central vertical section through one of the flanged film guiding rollers and its support.

Figure 1:
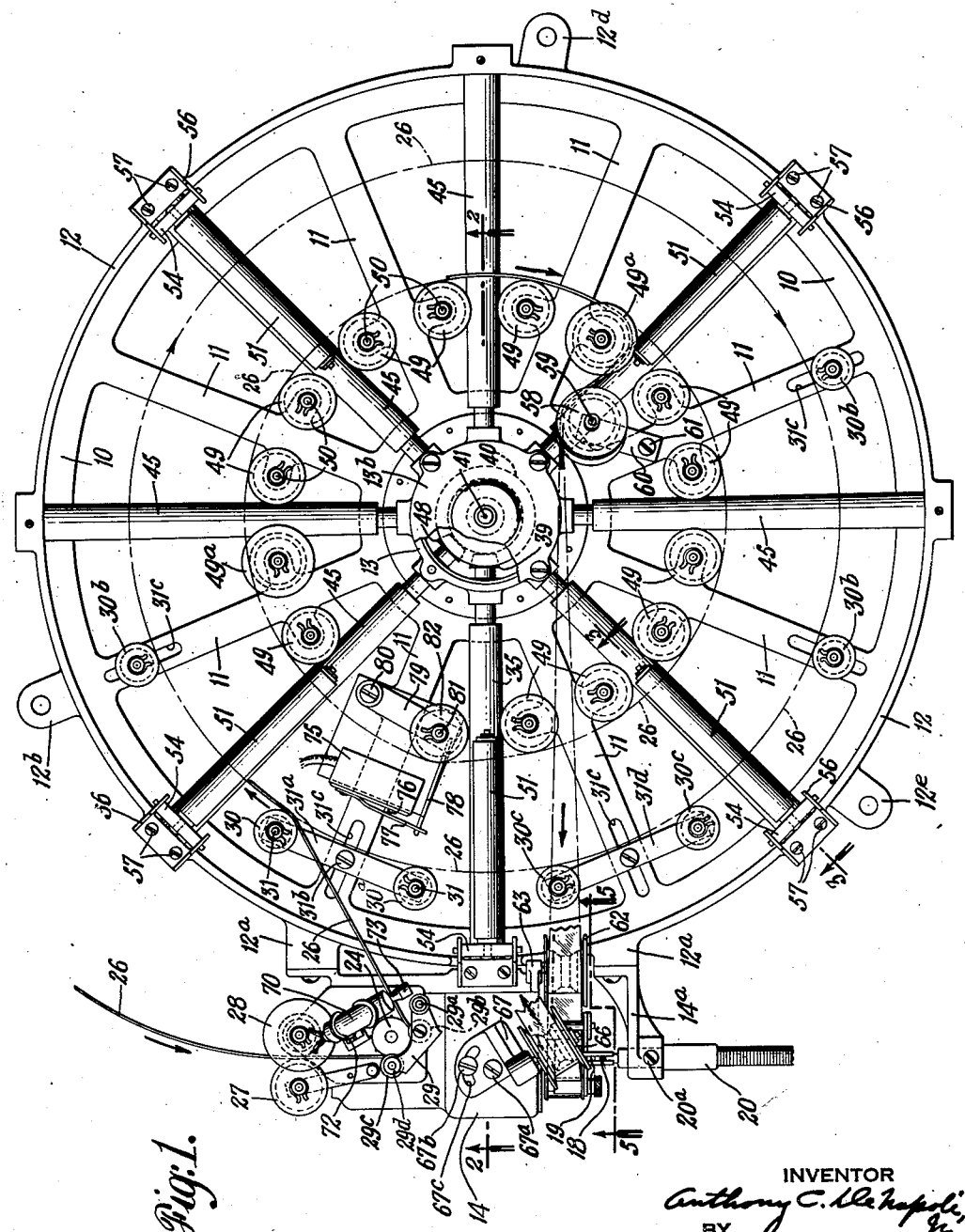
Fig. 1 is a plan view of a magazine, embodying the invention, with the main cover removed and a portion of a central cover-plate broken away to expose some of the interior mechanism.

Referring now to the drawings, the magazine has a main frame with a base portion 10 having spaced, radially extending arms or spokes 11 at the outer ends of which an annular flange 12 is provided. Near the center of the base portion a small circular housing 13 is secured to the frame by screws or the like (not shown), this housing having an upstanding, annular wall 13a which carries at its top a closure plate 13b secured by screws or the like. At one side the main frame is provided with bosses 12a to which a housing 14 and a bracket 14a are secured. The housing encloses the gearing through which a driving connection is effected to the various driven parts.

Within the housing 14 there is mounted a shaft 15 which is journaled in the walls of the housing by means of bearing units 16 and 17. These may be any suitable form of anti-friction bearings, such as bronze bushings, ball bearings or oilless bearings of well known type. The shaft 15 is parallel with a line tangent to the adjacent portion of the flange 12 of the frame. At its outer end the shaft 15 is hollow and is adapted to be disconnectably connected as by means of a key 18 and slot 19, with the end of a flexible shaft 20. The latter, having the end of its sheath supported by bracket 14a is adapted to be driven in any suitable way in synchronism with the driven parts of the projector. A set screw 20a, or any other suitable means, such as a thumb screw, may be provided to retain the sheath of the flexible shaft in place. This arrangement enables a quick substitution of one film magazine for another.

The shaft 15 is provided with a spiral or helical gear 21 adapted to mesh with a similar gear 22 secured to a substantially vertical shaft 23 suitably journaled in bearing units 23a and 23b in the top and bottom walls, respectively, of the housing 14. These bearing units may be of any of the types hereinbefore suggested. Shaft 23 extends above the top wall of housing 14 and has secured thereto, adjacent its upper end, a sprocket 24 provided with spaced teeth 25 adapted to cooperate with the usual feeding apertures at either one or both edges of a moving picture film. The connection between the shafts 15 and 23 is preferably such that they will rotate at the same angular speed. The film 26, after having passed through the projection apparatus, is returned to the magazine and is properly guided into engagement with the feed roller 24 by a pair of rollers 27 and 28 suitably journaled on substantially vertical studs or spindles carried by the frame. Roller 28 is preferably provided with broad flanges which extend over and under the film to retain it in proper position. A frame 29 pivoted at 29a upon the housing 14, and provided with a pair of rollers 29b and 29c; serves to hold the film against the feed sprocket 24. The frame 29 may be shifted outwardly about its pivot by means of a knob 29d which may be mounted in a well known manner, at the upper end of a spring urged latching rod which passes through the roller 29c. Outward movement of this frame will facilitate threading of the film.

After passing around a portion of the feed roller 24, and properly engaging the teeth of the latter, the film passes over the edge of the flange 12 of the frame and then around a flangeless guide roller 30 carried by a stud 31 secured to a bracket 31a. The latter is adjustable radially by cooperation of a securing screw 31b with a radial slot 31c in one of the spokes 11 of the base portion of the frame. Another roller 30a, similar to roller 30, is provided at the end of the opposite arm of bracket 31a. The two rollers serve to direct the film, as it advances, around the outer coil of the series wound from the outside inwardly, within the magazine. This outer coil is guided further by additional, similar rollers 30b and 30c. The rollers 30b, preferably arranged as indicated in Fig. 1, may be mounted adjustably directly on certain of the spokes 11. Rollers 30c may be mounted on an adjustable bracket 31d, similar to member 31a.

The particular form of the rollers 30, 30a, 30b and 30c may vary but a highly desirable construction is illustrated in Fig. 8, which is a cross-section through one of the rollers 30b. They are preferably formed of some moldable plastic and provided with a grooved or relieved portion 30d to avoid rubbing the active areas of the film. Only the edges of the film engage the periphery of each roller. Bronze bushings 30e, or the like, may be provided at each end of the roller and journaled upon a rod 30f secured to the spoke 11 by means of a nut 30g. Radial adjustment is provided by the elongated slot 31c in the spoke. A sleeve 30h pressed on, or otherwise secured to, the rod 30f permits clamping of the rod by nut 30g, in the manner explained. A spring clip 30k cooperating with a shallow groove adjacent the upper end of the rod serves to retain the roller in place.

Returning to the driven connections within the housing 14, there is also mounted on the shaft 15 a spiral or helical gear 32 (Fig. 4) which meshes with a similar gear 33 (Fig. 2) secured to the trunnion 34 of a roller 35 disposed radially within the magazine. Preferably, the gears 32 and 33 are such that the roller 35 will be rotated at a greater angular speed than the shaft 15. The ratio of the drive between the shafts may suitably be 4 to 5. Roller 35 is supported for free rotation in the frame by a bearing unit 36, of any suitable type, at the free end of the trunnion 34 and by a similar bearing unit 37 associated with a trunnion 38 at the opposite end of the roller. At the extreme end of the trunnion 38 there is secured a bevel pinion 39 adapted to mesh with a large bevel gear 40 secured to a shaft 41 disposed substantially vertically at the center of the housing 13. Bushings or other bearing units 42 and 43 are preferably provided at the two ends of the shaft 41, these being retained, respectively, by the base portion of the housing and by the closure plate 13b. The various bearings carried by the housing 13 are preferably made substantially oil tight so that the housing may be filled with a suitable lubricant.

At angularly spaced intervals the magazine is provided with a series of rollers 45, in all respects similar to the roller 35 except for the length of the trunnion at the outer end of the roller. Rollers 45, of which seven are provided in the illustrative embodiment of the invention, are suitably journaled at their outer ends in bearings 46, of any appropriate type, carried by the flange 12 of the frame. Suitable bosses are provided on the flange for this purpose. At their inner ends rollers 45 are journaled in bearings 47 carried by the housing 13. Bevel pinions 48 meshing with the gear 40 are secured to the inner ends of the inner supporting trunnions of the rollers 45 so that these will rotate in unison with the roller 35.

As shown, the rollers 35 and 45 are provided with a slight taper. This taper should not be great but should be sufficient to provide a very gradually decreasing peripheral speed from the outer ends of the rollers toward their inner ends. In a suitable construction the rollers may, for example, be about 7" long and have a diameter of 1¼ of an inch at their outer ends. It has been found that a taper of about .008" on the diameter, per running inch will produce good results. It will be appreciated that the linear speed of advance of all portions of the film will be the same. Therefore, in theory, rollers 35 and 45, which support the coils of the film, should simply be cylindrical. However, it has been found that less tendency toward pulling or packing of the film, and a better feeding action in general, is provided by forming the rollers with a slight taper of the character indicated. The film has a tendency to creep toward the larger diameter portions of the rollers and thus avoid packing toward the center. The speed of rotation of the rollers is preferably such that the portion of its surface engaged by the edge of the innermost coil of the film travels at very nearly the same speed as this coil while the portion of the roller engaged by the edge of the outermost coil of the film travels at a slightly greater speed than that of the film. A slight over-drive is provided, however, at all points.

A plurality of guide rollers 49 is provided in a circle intermediate the housing 13 and the rim of the frame 10. These rollers are freely rotatable upon studs 50 which have their lower ends threaded into projections at the sides of the spokes 11. The rollers may be formed and mounted in the same manner as the rollers 30b (Fig. 8) except that they are of larger diameter and the supporting studs are not radially adjustable. Any other type of anti-friction mounting may be employed so that the rollers will present as little resistance as possible to turning. The arrangement is such that the innermost coil of the film passes around and engages the outer edges of the series of rollers 49. All of the guide rollers, except those which must assist in changing the direction of the film or impart a twist to it, are preferably of flangeless construction. However, two of the circular series of rollers 49 are preferably provided with flanges on top which are in the form of thin metal discs secured by rivets or the like to the plastic body. These flanged rollers, designated 49a in Fig. 1 are so situated as to insure proper guiding of the film.

Above the coiled film there is provided a series of elongated rollers 51, (Figs. 1, 3 and 7) preferably of smaller diameter than the rollers 35 and 45. They are simply cylindrical and are not driven but are mounted for free rotation upon a series of shafts 52. Anti-friction bearing elements 53 of any suitable form may be provided adjacent the opposite ends of each of the rollers to enable it to rotate freely upon the shaft 52. In the preferred construction, only five of the upper rollers 51 are provided, one of these being vertically aligned with roller 35 and the other four being vertically aligned with alternate ones of the seven rollers 45. The arrangement, preferably, is such that two of the rollers 51 are above the rollers 45 which are at opposite sides of the roller 35. This has been found most effective for retaining the coils of the film lightly against the lower rollers in proper frictional engagement therewith. At the same time it does not impose an objectionable load upon the film in turning the upper rollers. A smaller or greater number of rollers and a different arrangement might, however, be employed. The outer ends of the shafts 52 extend through pins 54 having their reduced ends pivotally and slidably mounted in vertical slots 55 formed in upstanding arms of yokes 56, secured to the upper edge of the flange 12 by screws 57. The outer end of the shafts 53 are peaned over, as indicated in Fig. 7, to secure the same in the pins 54. Their inner ends are entirely free so that the rollers rest by gravity upon the coils of the film. The arrangement is such that the rollers 51 are permitted to move freely in a substantially vertical direction within the limits of the slots 55.

Intermediate one of the rollers 49a, and an adjacent roller 49, and radially inward thereof, there is provided a somewhat similar guide roller 58 carried by a stud 59 secured to a bracket 60 attached by a screw 61 to one of the spokes 11 of the frame. The roller 58 is preferably of the same diameter and construction as the roller 30 but has secured to both its upper and lower ends, by means of rivets or the like, large flanges adapted to extend over and under the edges of the film. Bracket 60 extends upwardly and then over the adjacent roller 45 and is tilted to incline the axis of the roller 58 slightly toward the top and toward the right of Fig. 1. This inclination may suitably be about 15° to the vertical. The arrangement is such that the innermost coil of the film is passed about 90° around the circumference of the roller 49a and then with a slight twist is passed around a portion of the roller 58. It is then twisted further, from a substantially vertical to a substantially horizontal position, and led over a flanged guide roller 62 suitably journaled in a bracket 63 extending upwardly from the housing 14. From the roller 62 the film is led downwardly and around a sprocket 64 secured to an extension of the shaft 15 and hence driven in synchronism with the sprocket 24. A frame 65, similar to the frame 29, serves to hold the film in proper engagement with the socket. This frame is adapted for pivotal movement to facilitate threading of the film. From the sprocket 64 the film is carried upwardly over a flanged roller 66 journaled at the upper end of a bracket 67 secured to the top of the housing 14. This bracket is preferably adjustable angularly on the housing and, for this purpose, is attached pivotally by a screw 67a and may be clamped in adjusted position by a screw 67b cooperating with an arcuate slot 67c. From this point the film is formed into a loop and passed to the projection and sound-reproducing equipment, as heretofore described, a certain amount of slack being provided in the film leading to and from the projector to insure freedom of action.

Any suitable form of cover (not shown) may be provided over the entire frame, if desired.

The frame of the magazine is supported in a cabinet or the like by means of screws or bolts passing through lugs 12b, 12d and 12e extending radially from the flange 12. It is mounted, preferably, in such a way that it is tilted slightly at a small angle to the horizontal. This tilt is in such a direction and of such magnitude that the side of the base portion 10 in the region of the lug 12b is about half an inch higher than the diametrically opposite side of the base portion, in a unit in which the flange 12 is about 18 inches in diameter. The tilting of the magazine in this way has been found to assist in the proper functioning of the magazine. It helps to relieve the bulging tendency of the coils of the film on the entrance side, in the region of rollers 30 and 30a, and the packing tendency at the diametrically opposite side. Gravity action is apparently responsible for this improvement in the operation.

Various safety devices may be provided, such as means for stopping the machine when the film is broken, or about to break, or when the film becomes so tightly packed in the magazine as to be likely to have its surface injured. Thus, referring to Figs. 1, 2 and 4, a mercury switch 70 may be carried by a frame 71 pivotally attached by a screw 72 to a bracket extending upwardly from the housing 14. The mounting of the frame 71 is such that gravity tends to rock it in a clockwise direction (Fig. 4) until a roller 73, mounted on a pin 74 secured to the frame, engages the edge of the film as it passes from the sprocket 24 to the guide roller 30. The switch 70 may be so constructed and arranged in the control circuit of the machine that when the frame 71 is rocked clockwise, due to the fact that the roller 73 is permitted to drop by a break or bad tear in the film, the machine will automatically be stopped. A signal, such as a bell or light, may also be operated at this time, if desired.

Another switch 75, adapted to be operated by a slight movement of a plunger 76, may be mounted on one of the spokes 11 of the frame. A spring arm 77 secured to the switch is arranged to engage and operate the plunger 76. At its free end the arm 77 is connected by a link 78 with a lever 79 pivotally attached by a screw 80 to the frame. Lever 79 also carries a stud 81 on which is mounted a guide roller 82, similar to the rollers 49. The arrangement is such that the roller 82 replaces two of the rollers 49 which would normally be provided on the spoke to which the switch is attached. The innermost coil of the film is normally bulged outwardly slightly by the roller 82 in passing from roller 49 at one side to the roller 49 at the other side. However, if the film becomes too tightly packed or if, for some reason, the film is fed out of the magazine more rapidly than it is fed in or is advanced within the magazine, the section of the inner coil passing the roller 82 will be tightened or straightened and will thus force the roller inwardly and operate the switch 75. This may cause the machine to stop and may operate a visible or audible signal, or it may exert any other desired control.

The operation of the magazine will be clear from the foregoing. It may be briefly summarized as follows: The film 26, after leaving the projection and sound-reproducing equipment, is passed around the guide roller 28 and the feed roller 24 and then into the magazine. Here it is wound in a series of coils from the outside inwardly, the coils being supported by eight lower rolls 35 and 45, all of which are driven. Due to the slight taper of these rollers, there is a tendency to advance the outer coils of the film at a slightly greater linear speed than the inner coils. Of course, the actual linear speed of the film is the same at all points within the magazine but the effect of the taper of the lower rollers is to cause the film to be pushed rather than pulled as it works from the outside toward the center of the spiral and is constantly being withdrawn from the center. Moreover, the slight taper seems to have the effect of a crown on a pulley wheel, thus urging the coils toward the outer ends of the rollers. This serves to keep the coils loosely wound and eliminates excessive rubbing of the surfaces of the film. To assist in retaining the coils in proper relation in the magazine, the five idler rollers 51 rest freely by gravity upon the upper edges of the coils. The innermost coil passes around a series of guide rollers 49 and 49a and the film is led out of the machine by passing it from one of the rollers 49a around a guide roller 58 and then around a roller 62, feed sprocket 64, and roller 66 back to the projection and sound-reproducing equipment. Power for driving the feed sprockets 24 and 64 and the supporting rollers 35 and 45 is supplied through the flexible shaft 20 rotated in synchronism with the projection and sound-reproducing equipment.

While an illustrative embodiment of the invention has been described in considerable detail, it will be understood that various changes may be made in the construction and arrangement of the several parts without departing from the general principles and scope of the invention. The dimensions and form of the various parts may be varied to suit the particular requirements of the apparatus. Thus, while the taper of the rollers 35 and 45, hereinabove specified, is specially suited for the purposes stated, this may be varied to some extent without seriously interfering with the proper functioning of the device. It may, for some purposes, be eliminated altogether, although the change of diameter is preferably made somewhere between .005 and .015 of an inch per linear inch. The terms and expressions employed herein have been used as terms of description and not of limitation.

What I claim is:

1. In apparatus of the class described a frame, a plurality of radially disposed rollers carried by said frame, each of said rollers having its axis disposed substantially horizontally and having a tapered outer surface with the larger diameter outermost, said taper being only sufficient to produce the climbing effect of a crowned pulley, means for rotating said rollers positively at the same speed, means for guiding a film and directing the same edgewise onto said rollers to form a series of coils thereon winding from the outside inwardly, and means for directing the film away from said rollers after it has traversed said series of coils.

2. In apparatus of the class described a frame, a plurality of radially disposed rollers carried by said frame, each of said rollers having its axis disposed substantially horizontally and having a tapered outer surface with the larger diameter outermost, said taper being only sufficient to produce the climbing effect of a crowned pulley, means for rotating said rollers, means for guiding a film and directing the same edgewise onto said rollers to form a series of coils thereon, a plurality of cylindrical rollers resting upon the upper edges of the coils of said film, and means for directing the film away from said rollers after it has traversed said series of coils.

3. In apparatus of the class described a frame, a plurality of radially disposed rollers carried by said frame, each of said rollers having its axis disposed substantially horizontally and having a tapered outer surface with the larger diameter outermost, means for rotating said rollers, means for guiding a film and directing the same edgewise onto said rollers to form a series of coils thereon, a plurality of rollers resting upon the upper edges of the coils of said film, said rollers being fewer in number than said first-mentioned rollers and being vertically alined with certain of the latter, and means for directing the film away from said rollers after it has traversed said series of coils.

4. In apparatus of the class described a frame, a plurality of radially disposed rollers carried by said frame, each of said rollers having its axis disposed substantially horizontally and having a tapered outer surface with the larger diameter outermost, said taper being only sufficient to produce the climbing effect of a crowned pulley, means for rotating said rollers, means for guiding a film and directing the same edgewise onto said rollers to form a series of coils thereon winding from the outside inwardly, a plurality of cylindrical rollers resting upon the upper edges of the coils of said film, each of said last-mentioned rollers being mounted for free vertical movement and free rotation and being held by gravity against said film coils, and means for directing the film away from said first-mentioned rollers after it has traversed said series of coils.

5. In apparatus of the class described a frame, a plurality of radially disposed rollers carried by said frame, each of said rollers having its axis disposed substantially horizontally and having a tapered outer surface with the larger diameter outermost, said taper being only sufficient to produce the climbing effect of a crowned pulley, means for rotating said rollers, means for guiding a film and directing the same edgewise onto said rollers to form a series of coils thereon, said film being advanced from the outside inwardly along said series of coils, anti-friction means for guiding and retaining the innermost coil, and means for directing the film upwardly and outwardly from the inner side of said series of coils to a point outside thereof and above the same.

6. In apparatus of the class described a frame, a plurality of radially disposed rollers carried by said frame, each of said rollers having its axis disposed substantially horizontally and having a tapered outer surface with the larger diameter outermost, means for rotating said rollers, the taper of said rollers being about .008 of an inch on the diameter per linear inch, means for guiding a film and directing the same edgewise onto said rollers to form a series of coils thereon winding from the outside inwardly, and means for directing the film away from said rollers after it has traversed said series of coils.

7. In apparatus of the class described a frame, a plurality of radially disposed rollers carried by said frame, each of said rollers having a tapered surface with the larger diameter outermost, means for rotating said rollers, the taper of said rollers being about .008 of an inch on the diameter for each inch of the length thereof, means for guiding a film and directing the same edgewise onto said rollers to form a series of coils thereon supported against gravity thereby, said film being advanced from the outside inwardly along said series of coils, means for lightly urging said coils against said rollers, and means for directing the film away from said rollers after it has traversed said series of coils.

8. In apparatus of the class described a frame, a plurality of radially disposed rollers carried by said frame, each of said rollers having a tapered outer surface with the larger diameter outermost, means for rotating said rollers, the taper of said rollers being such that the increase in diameter is at the rate of between .005 and .015 of an inch per linear inch, means for guiding a film and directing the same edgewise onto said rollers to form a series of coils thereon supported against gravity thereby, said film being advanced from the outside inwardly along said series of coils, anti-friction means for guiding and retaining the innermost coil, and means for directing the film upwardly and outwardly from the inner side of said series of coils.

9. In apparatus of the class described a frame, a plurality of radially disposed rollers carried by said frame, said frame being tilted to place the axes of said rollers in a plane at a slight angle to the horizontal, each of said rollers having a tapered outer surface with the larger diameter outermost, means for rotating said rollers, means for guiding a film and directing the same edgewise onto said rollers at a point above the diametral line along which said frame is tilted to form a series of coils thereon winding inwardly from the outside, and means for directing the film away from said rollers after it has traversed said series of coils.

10. In apparatus of the class described a frame, a plurality of radially disposed rollers carried by said frame with their axes substantially in a plane inclined at a small angle of not more than about 2 degrees to the horizontal, means for rotating said rollers, means for directing a film into edgewise engagement with said rollers and maintaining said film in a series of spirally arranged coils on said rollers, and means for guiding the film away from said rollers after it has traversed said series of coils, said film advancing from the outside to the inside of said series of coils and being directed into the coils on the high side and removed therefrom on the low side of the diametral line about which said frame is inclined.

11. In apparatus of the class described a frame, a plurality of radially disposed rollers carried by said frame with their axes substantially in a plane inclined at a small angle to the horizontal, each of said rollers having a slightly tapered outer surface, means for rotating said rollers, means for directing a film into edgewise engagement with said rollers and maintaining said film in a series of spirally arranged coils on said rollers, said film advancing along said rollers from the larger toward the smaller ends thereof as it traverses the successive coils, and means for guiding the film away from said rollers after it has traversed said series of coils, said film advancing from the outside to the inside of said series of coils and being directed into the coils on the high side and removed therefrom on the low side of the diametral line about which said frame is inclined.

12. In apparatus of the class described a frame, a plurality of circularly arranged rollers carried by said frame, said rollers being disposed substantially radially of the circle formed thereby, means for rotating said rollers, means for introducing a film adjacent the periphery of said frame and directing it edgewise onto said rollers to form a spiral series of coils thereon, and means for directing said film away from said rollers after it has traversed said coils, said frame being tilted at a small angle of not more than about 2 degrees to the horizontal with the point of introduction of the film on the high side thereof and the point of withdrawal of the film on the low side of the diametral line about which said frame is inclined 13. In apparatus of the class described a frame, a pair of concentrically arranged series of guide rollers carried by said frame, a plurality of elongated film supporting rollers disposed radially of said concentric series of guide rollers and having their axes substantially horizontal, means for introducing a film edgewise onto said elongated rollers adjacent one of said series of guide rollers and forming a spiral series of coils between the two series of guide rollers, means for rotating said elongated rollers, and means for directing the film away from said elongated rollers after it has traversed said coils, said frame being tilted at a slight angle to the horizontal with the point of introduction of the film on the high side and the point of removal on the low side of the diametral line about which said frame is tilted.

14. In apparatus of the class described a frame, a pair of concentrically arranged series of guide rollers carried by said frame, a plurality of elongated film supporting rollers disposed radially of said concentric series of guide rollers, means for introducing a film edgewise onto said elongated rollers adjacent one of said series of guide rollers and forming a spiral series of coils between the two series of guide rollers, means for rotating said elongated rollers, means for directing the film away from said elongated rollers after it has traversed said coils; one of the guide rollers of the inner series being shiftable, spring means urging said guide roller outwardly against the action of the inner coil of said film, and a switch operable to stop the operation of said elongated rollers when said guide roller is shifted a predetermined extent by the tightening of said inner coil.

ANTHONY C. DE NAPOLI, Jr.